United States Patent [19]

Kirkham et al.

[11] Patent Number: 4,518,194

[45] Date of Patent: May 21, 1985

[54] AUTOMATIC TRUCK BED COVER ASSEMBLY

[76] Inventors: Robert L. Kirkham, Rte. 6 Nat Cox Rd., Cartersville, Ga. 30120; Garland F. Forrest, Jr., 12011 Winston Ct., Louisville, Ky. 40229

[21] Appl. No.: 554,504

[22] Filed: Nov. 23, 1983

[51] Int. Cl.³ ............................................. B60J 7/10
[52] U.S. Cl. ................................. 296/100; 160/84 R
[58] Field of Search ................ 296/100, 98; 160/84 R

[56] References Cited

U.S. PATENT DOCUMENTS

| | | | |
|---|---|---|---|
| 3,416,835 | 12/1968 | Ohle | 296/100 |
| 3,649,072 | 3/1972 | Cross | 296/100 |
| 3,986,749 | 10/1976 | Hull et al. | 296/100 |
| 4,273,377 | 6/1981 | Alexander | 296/100 |

FOREIGN PATENT DOCUMENTS 1003892  4/1963  United Kingdom ................ 296/100

Primary Examiner—Robert R. Song
Attorney, Agent, or Firm—Richard L. Caslin

[57] ABSTRACT

A cover assembly is shown for a pickup truck having an open-topped bed. Supported from the top of the side panels of the truck bed is a track that is positioned within the bed and is formed by a pair of parallel rails of C-channel configuration, having an elongated slot extending longitudinally thereof and facing a similar slot on the other rail. The front end of each rail extends partially into a storage box that is fitted down into the truck bed at the front thereof, and this box extends transversely thereof. The track is furnished with a travelling rectangular frame having a pair of flexible side portions formed by a plurality of hinged slide bars that travel within the parallel rails. These slide bars are separated by a short link so that this travelling frame may fold into accordion folds when the frame is shifted forwardly into the storage box. A sheet of flexible material is fitted over the travelling rectangular frame for covering the truck bed. Motor means is furnished for driving the travelling frame and controlling the movement and location of the frame and its cover sheet.

7 Claims, 10 Drawing Figures

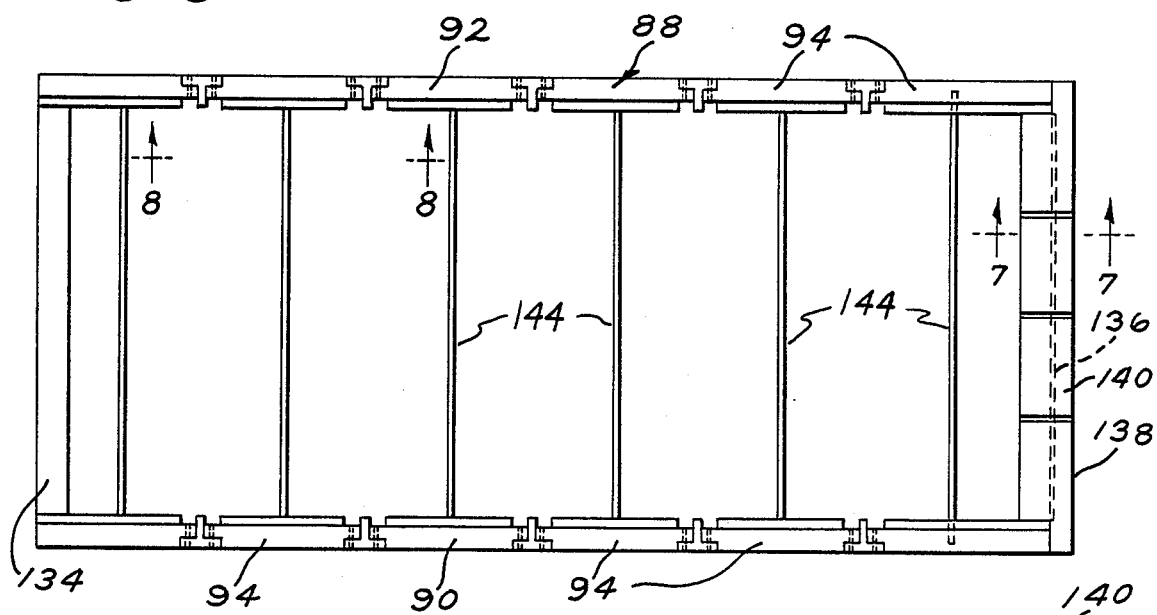
FIG. 6
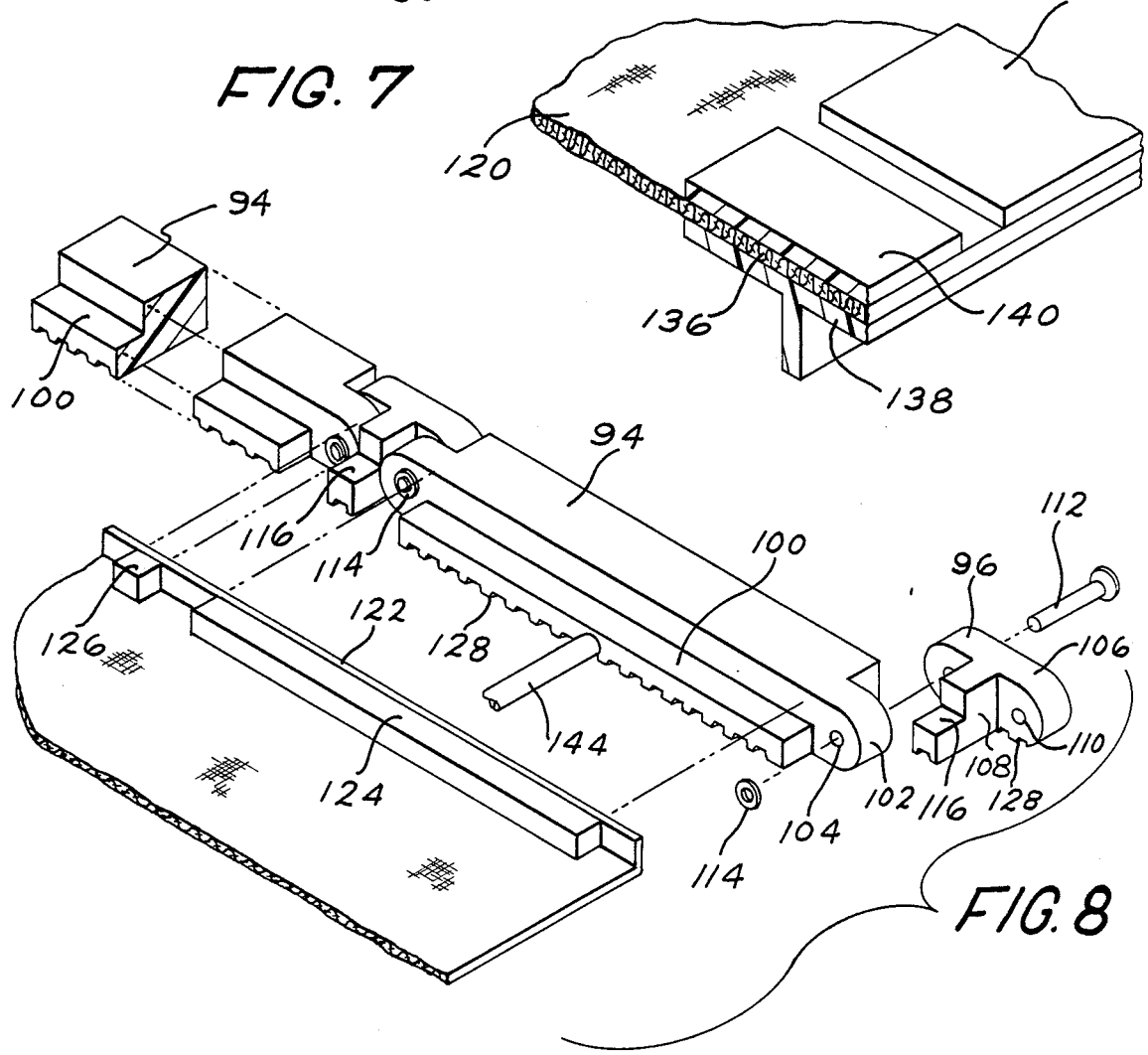
FIG. 7
FIG. 8

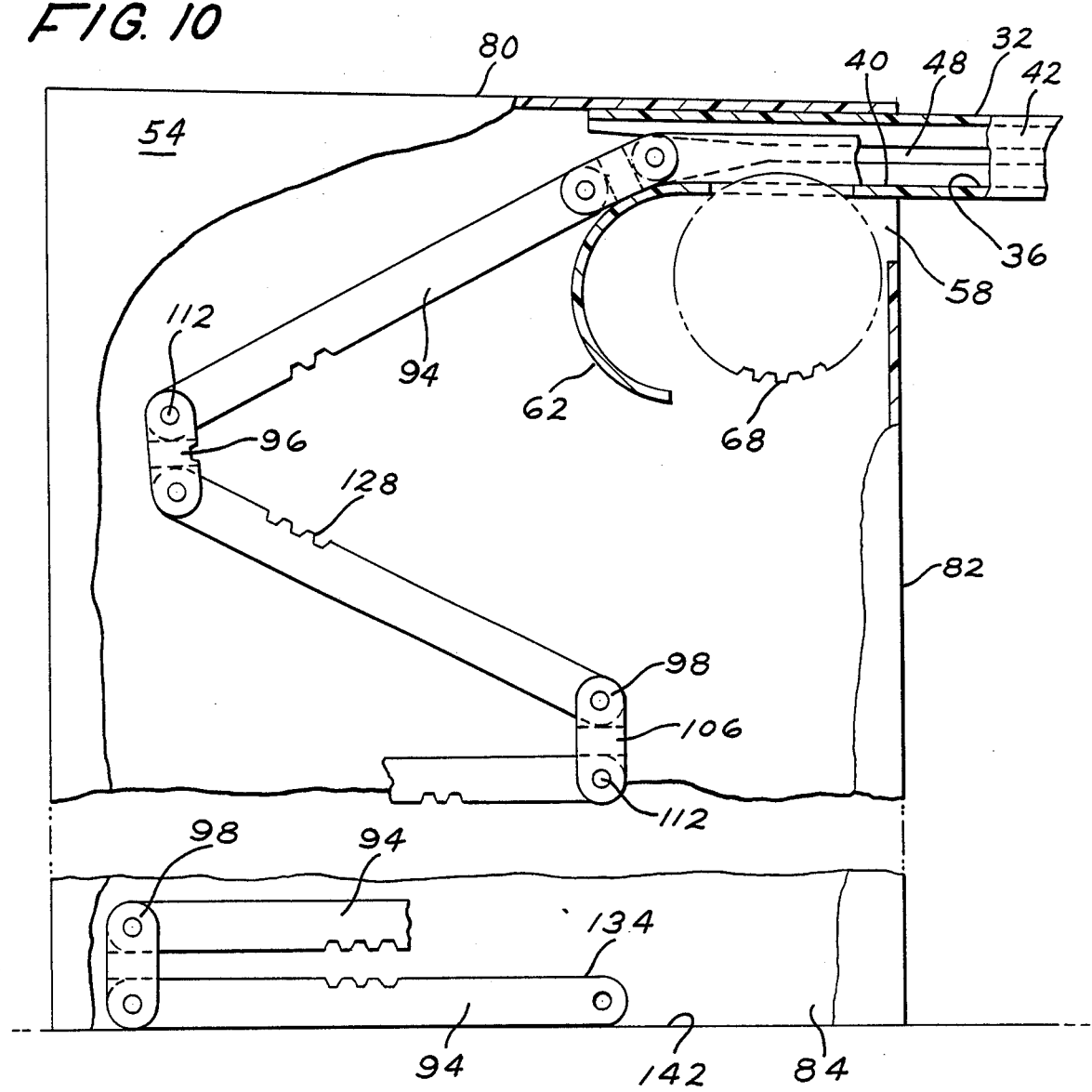
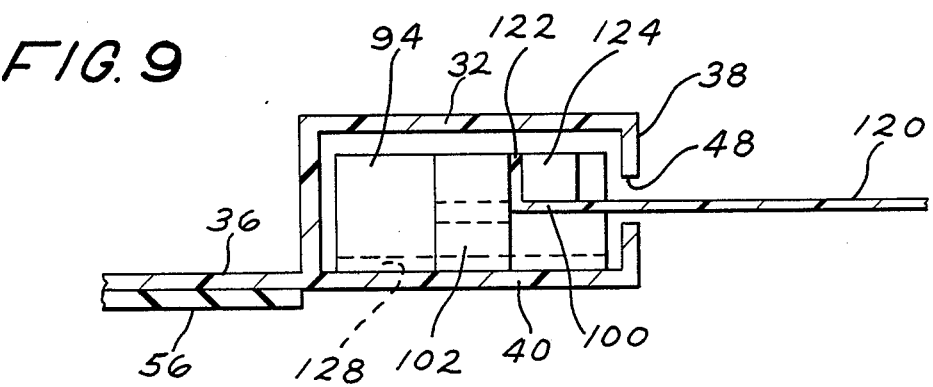

AUTOMATIC TRUCK BED COVER ASSEMBLY

BACKGROUND OF THE INVENTION

1. Field of the Invention

This invention relates to the art of automatic truck bed covers as for use with the truck bed of a pickup truck where the cover when closed serves to protect the contents of the truck bed from inclement weather, as well as serves as a security means to protect the contents from vandals and thieves. Of course, this invention is likewise usable with larger truck beds, such as dump trucks and open top trailers.

2. Description of the Prior Art

The Thorpe U.S. Pat. No. 3,774,958 shows a conventional dump truck having a sheet metal cover which is wound upon a cylindrical member which is motor-driven for opening and closing the cover. The opposite guide members for the stainless steel cover have a sinusoidal configuration to provide lateral strength to the sheet metal member.

The Penner U.S. Pat. No. 4,046,416 describes an open top truck body with a flexible cover or tarpaulin that is wound on the surface of a transverse longitudinal roller assembly, similar to a roller blind mechanism. An endless chain is journaled around front and rear sprockets. A source of motor power is connected to the sprockets so that movement of the chain will cause movement of the mounting plates that cause the flexible cover to move between its open and its closed position.

The Marvin et al U.S. Pat. No. 4,210,361 describes a sliding cover assembly for open body trucks, such as a pickup truck. The cover is a rigid cover formed of a sheet of corrugated material. There are rollers that are mounted on the opposite side edges of the corrugated cover to bear against the interior vertical wall of the track. There is a transverse shaft that has a coil spring that serves to provide torsional forces necessary to wind the slide cover thereon. In other words, this is not a motor-driven cover, but one that is manually open and closed.

The Campbell U.S. Pat. No. 4,252,362 shows a pickup truck bed cover a multi-channeled track working in combination with the pickup bed cover. The canopy of the cover comprises a double-layered sheet of fabric, such as canvas, heavy plastic, or the like, that is housed on a reel. The canopy includes a plurality of transversely extending guide members that take the form of rigid rods on the ends of which are mounted rollers. There is a hand lever and rack and pawl for applying mechanical force for winding the cover onto the reel. This is not a motor-operated system, but rather a manual system.

The German Pat. No. 2,594,910 shows a roll-up type vehicle top cover using a tarpaulin. A roller is mounted at the front end of the truck for supporting the cover, and there are tracks along the top edges of the side walls of the truck body in which the tarpaulin is supported. Take-up spools or sheaves are mounted at the rear of the trailer, and they are keyed to a common shaft which may be revolved by means of a crank engaging the shaft. This is another cover that is not motor operated.

The Albrecht et al U.S. Pat. No. 4,199,188 shows rigid covers for the open top of a truck body, but there is no flexible cover that is motor-operated as in the present invention.

OBJECTS OF THE PRESENT INVENTION

The principal object of the present invention is to provide an automatic cover assembly for a truck having an open-topped bed by providing a track supported from the side panels of the truck bed for supporting a flexible travelling frame over which a flexible cover sheet is mounted, where the flexible travelling frame is capable of assuming accordion folds when the frame is shifted forwardly into a storage box within the truck bed.

A further object of the present invention is to provide a cover assembly of the class described with a flexible travelling frame made from a plurality of hinged slide bars that are furnished with gear teeth on the underside thereof for cooperation with a motor-driven gear in the manner of a rack and pinion drive.

A further object of the present invention is to provide an automatic cover assembly of the class described with the use of an elongated wedge member under the track so that the flexible cover will be inclined downwardly from front to rear so that rain-water will naturally run off and not accumulate on the cover assembly.

A still further object of the present invention is to provide a cover assembly of the class described where at least some of the plurality of hinged slide bars are furnished with a transverse rod spanning the space between opposite slide bars to support the flexible cover sheet.

SUMMARY OF THE INVENTION

The present invention provides an automatic cover assembly for a truck having an open-topped bed with a track of parallel rails mounted on the top of the side panels of the bed. Each of the parallel rails extends partially into a storage box that is mounted at the front of the bed to extend transversely thereof. The track is furnished with a travelling rectangular frame having a pair of flexible side portions formed by a plurality of hinged slide bars that travel within the parallel rails. Adjacent slide bars are separated by a short link so that the flexible slide portions of the frame may assume accordion folds when the frame is shifted forwardly towards the storage box. A sheet of flexible material is fitted over the travelling frame for covering the truck bed. Motive means are furnished within the storage box for engaging the hinged slide bars for controlling the movement and location of the travelling frame and its cover sheet.

BRIEF DESCRIPTION OF THE DRAWINGS

This invention will be better understood from the following description taken in conjunction with the accompanying drawings, and its scope will be pointed out in the appended claims.

FIG. 6 is a top plan view of the travelling rectangular frame that is used in the present invention and travels on the track of this cover assembly, where the frame has a pair of flexible side portions formed by a plurality of hinged slide bars that travel within the rails of the frame. Note that the slide bars are furnished with a transverse rod spanning the space between opposite slide bars to support the flexible cover sheet, which has been left off of this view.

FIG. 7 is a fragmentary perspective view, on an enlarged scale, taken on the line 4—4 of FIG. 3, showing the details of construction of the rear cross brace of the travelling rectangular frame to depict the method of sealing the flexible cover sheet with the tailgate of the truck bed.

FIG. 8 is a fragmentary perspective view, on an enlarged scale, taken on the line 8—8 of FIG. 6, showing the nature of the hinged slide bars that are separated by a short link and provided with transverse gear teeth on the under surface thereof, as well as the method of mounting the edge of the flexible cover sheet to both the slide bars and to the short link members.

FIG. 9 is a fragmentary, transverse, cross-sectional view, similar to that of FIG. 2, but showing the hinged slide bar positioned within the C-channel as well as the flexible cover sheet mounted to the side of the slide bar.

FIG. 10 is a fragmentary, side elevational view, similar to that of FIG. 5, where the height of the storage box has been increased to illustrate the manner in which the travelling rectangular frame naturally collapses into accordion folds as the frame is shifted forwardly of the track to move into the storage box.

DESCRIPTION OF THE PREFERRED EMBODIMENTS

Figure 1:
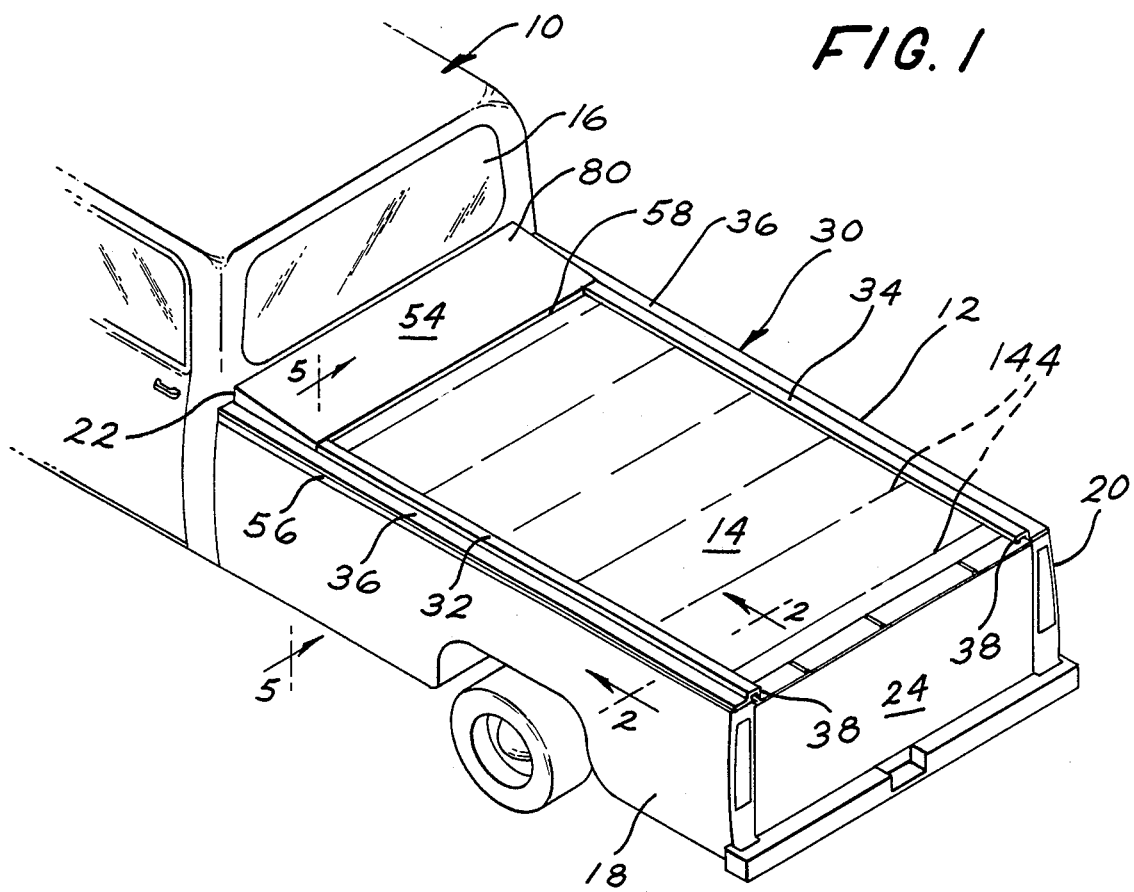
FIG. 1 is a top perspective view from the left rear side of a pickup truck, and showing an automatic truck bed cover assembly embodying the present invention covering the bed in its closed position.

Turning now to a consideration of the drawings, and, in particular, to the top perspective view of FIG. 1, there is shown a standard pickup truck 10 having an open-topped bed 12 which is furnished with the automatic truck bed cover assembly 14 embodying the present invention. While this invention 14 is shown used on a pickup truck, it should be understood by those skilled in this art that this invention can be used in larger trucks having open-topped beds, and that it is not limited for use with small pickup trucks. The present invention has general utility for use in covering open-topped truck beds of any size or configuration. The truck cab 16 is adapted to contain the motor controls (not shown) for determining the motion and position of the cover assembly 14.

The truck bed 12 has upstanding parallel side panels 18 and 20, a front end wall 22 adjacent a rear wall of the cab 16, and a tailgate 24.

Figure 2:
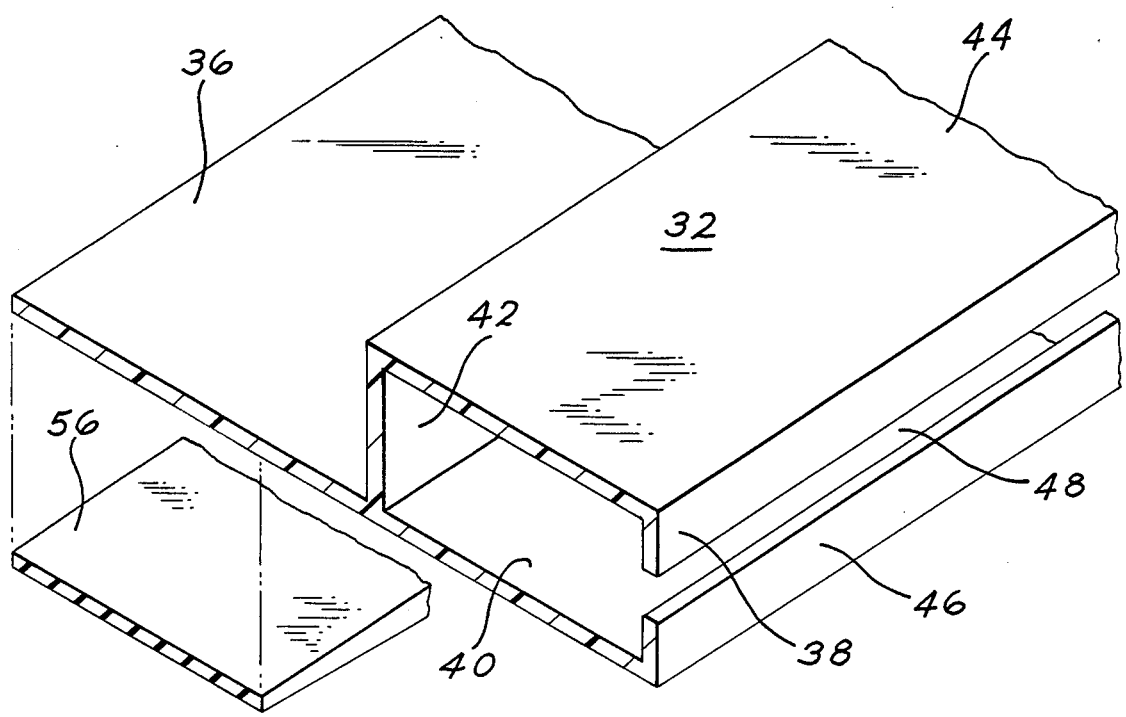
FIG. 2 is a cross-sectional perspective view, on an enlarged scale, taken on a line 2—2 of FIG. 1, and showing the nature of one of the parallel rails of the track which has a C-channel configuration, with an elongated slot extending longitudinally of the rail and located on the side of the rail facing a similar slot on the opposite rail.

This cover assembly 14 includes a wide track 30 formed by a pair of parallel rails 32 and 34 which are mounted from the top of the side panels 18 and 20 respectively. Each rail is of similar construction. Looking at FIG. 2, rail 32 has a flat, lower mounting plate 36 which extends for the complete length thereof, and it is adapted to overlie the top surface of the side panel 18 and to be mounted thereto by screw fasteners, or the like (not shown). The rail 32 has a C-shaped configuration 38 with a bottom wall 40 generally as an extension of the mounting plate 36, a vertical outer side wall 42, a top wall 44, and an inner side wall 46 that has an elongated slot 48 extending longitudinally thereof from one end to the other. It should be understood that the C-shaped configuration 38 of the rail 32 is totally within the truck bed to the inner side of the side panel 18. It should also be understood that the opposite rail 34 is formed of the same configuration, but it is turned around so that the elongated slot 48 is opposed to the similar slot 48 in the first rail 32. It has been found expedient to extrude these rails 32 and 34 from a thermoplastic material which is weather resistant and of long life and of lasting appearance, as well as being economical and lightweight for removal and replacement on and off the truck bed.

Figure 3:
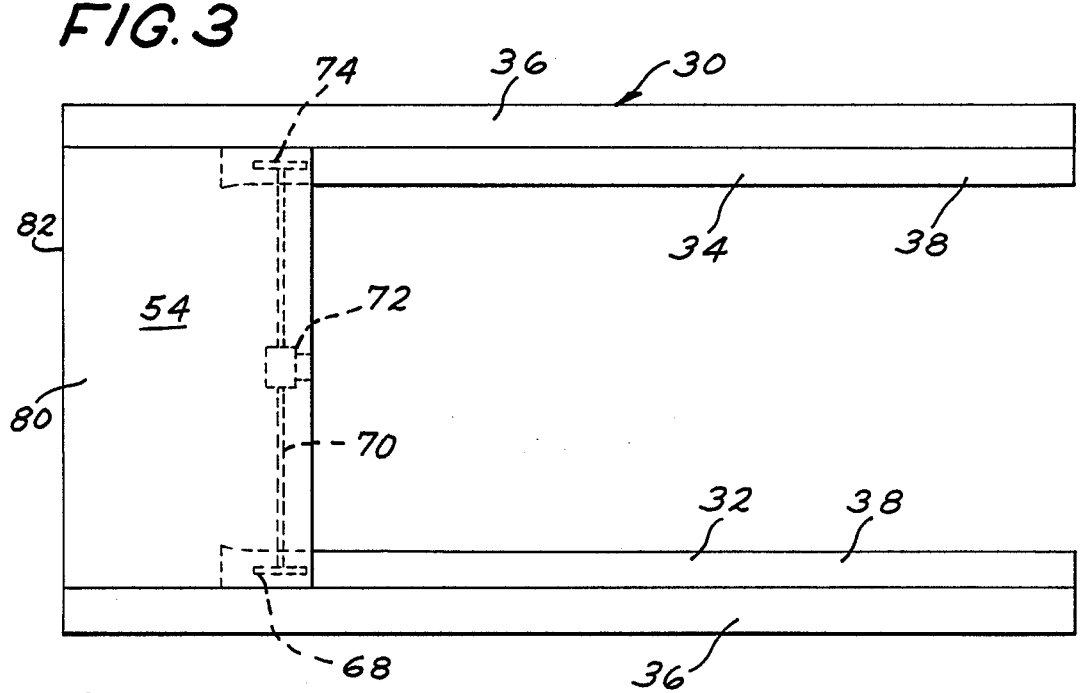
FIG. 3 is a top plan view of the track used in the present invention that includes a pair of parallel rails of C-channel configuration, where each rail is mounted within the truck bed and supported from the top of the side panels of the bed. The front end of each rail extends partially into a storage box that is adapted to be fitted down into the truck bed, where the box extends transversely of the bed. Notice the motor and gear drive system positioned within the storage box.
Figure 4:
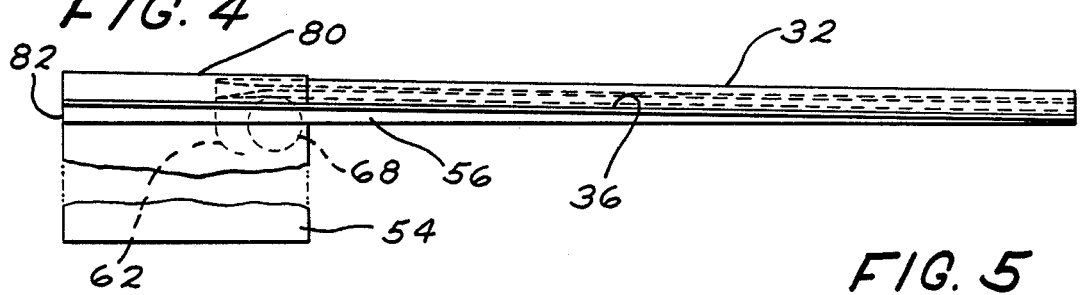
FIG. 4 is a left side elevational view of the track and storage box assembly of FIG. 3, with part of the box broken away in order to conserve space on the drawing.

Another view of the wide track 30 is the top plan view of FIG. 3 which shows the parallel rails 32 and 34. Positioned at the front end of these rails is an enlarged storage box 54 which is positioned within the front portion of the truck bed. Notice that the front end of the C-shaped configuration of each rail 32 and 34 projects inwardly of the storage box 54, as is shown in dotted lines in FIG. 3. The mounting plate 36 of each rail 32 and 34 extends for the complete length of the assembly, including along the sides of the storage box 54. It has been found expedient to provide the parallel rails 32 and 34 with a downwardly inclined slope from front to rear thereof, and this is provided by an elongated gasket 56 in the form of a wedge which is interposed underneath the mounting plate 36 on both rails 32 and 34, as is seen in FIGS. 1 and 4. This wedge-shaped gasket 56 is thick at the front end and thin at the rear end so that the rails 32 and 34 may be extruded of uniform cross section throughout. This gasket 56 would be a molded plastic part that would be able to withstand the weather and would not deteriorate over long periods of time.

Figure 5:
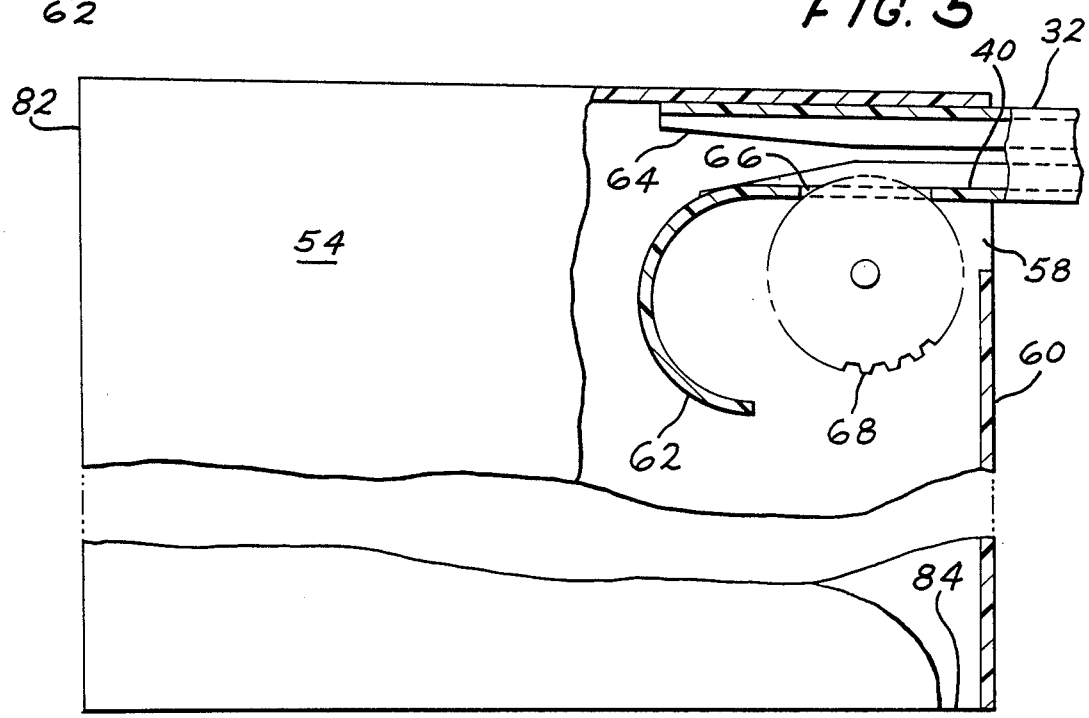
FIG. 5 is a fragmentary, side elevational view, on an enlarged scale, taken on the line 5—5 of FIG. 1, showing the storage box with parts broken away and others in cross section to show both the front ends of the parallel rails extending partially into the storage box and the nature of the motor-driven gear for providing the motor power for the cover assembly.

As stated earlier, FIG. 5 is a view taken on the line 5—5 of FIG. 1. Parts are broken away and others are in cross section, and you will notice how the rail 32 extends through an opening 58 in the wall 60 of the storage box 54. The forward end of the bottom wall 40 of the C-channel 38 is formed with a semi-cylindrical, downwardly extending guide ramp 62. In addition, the forward end of the longitudinal slot 48 is widened at 64. Also, the bottom wall 40 of the C-channel 38 has a short longitudinal slot 66 for receiving a plastic spur gear 68 therein of nylon or Teflon material. FIG. 3 shows that this spur gear 68 is mounted on a transverse shaft 70 within the storage box 54 and joined to an electric drive motor 72. This shaft 70 is extended on the other side of the motor 72 and is provided with a second spur gear 74 for cooperation with the rail 34.

The storage box 54 is also formed of plastic material, and the top wall 80 is formed integral with the four vertical side walls 82. This box 54 is open at the bottom at 84. It should be understood that the two rails 32 and 34 can be disassembled from the box 54, and then the box can be turned over to gain access to the interior through the open bottom wall 84.

Attention will now be directed to the travelling rectangular frame 88, as best seen in FIG. 6, which has a pair of flexible side portions 90 and 92, each formed by a plurality of hinged slide bars 94 that are designed to ride within the C-channels 38 of the rails 32 and 34 of the wide track 30. Each pair of adjacent slide bars 94 is separated by a short link 96 having a T-configuration for the purpose of allowing the hinged slide bars to assume accordion folds 98, as is best seen in FIG. 10. The detailed nature of the slide bars 94 and the short links 96 can best be understood from the exploded, fragmentary perspective view of FIG. 8. Each slide bar 94 is of elongated shape having a side step 100 on the innermost side of the bar. At each end of the bar is a lug 102 which includes a horizontal bolt hole 104. These lugs 102 project beyond the side step 100. The short T-link 96 has a vertical head 106 that is arranged at one side of a pair of opposing lugs 102, and this link also includes a stem 108 that projects perpendicularly from the head and is interposed between the pair of adjacent lugs 102. The head 106 has a bolt hole 110 at each side of the stem 108 to be aligned with the bolt hole 104 of opposing lugs 102. A pivot pin 112 is fitted through the bolt holes 104 and 110 and locked in place by a push-on nut 114 that locks on the free end of the pin 112. The inner end of the T-link 96 has a step 116 that conforms to the steps 100 of adjacent slide bars 94.

A thin cover sheet 120 of rubberized nylon material, or the like, is stretched between the flexible side portions 90 and 92 of the travelling rectangular frame 88. The side edges 122 of the cover sheet 120 are stretched to be seated upon the step portions 100 of the slide bars 94 and the step 116 of the T-link 96. Each slide bar 94 is fitted with an elongated mounting bar 124 which is adapted to sit upon the side step 100, as is best seen in FIG. 9. The side edge of the cover sheet 120 is sandwiched between the mounting bar 124 and the step 100, and the edge of the sheet also extends up one side of the mounting bar to be sandwiched between the side of the bar and the side of the slide bar 94. A suitable industrial-strength adhesive could be used for bonding the side edge of the cover sheet to the seat 100 and the side of the slide bar, as well as to the mating portions of the mounting bar 124. In a similar manner, the step 116 of the T-link 96 is fitted with a mounting block 126 which serves to bond the side edge of the cover sheet to the step 116 and to the side or end of the stem 108 of the T-link 96.

The underside of each slide bar 94, as well as the underside of each T-link 96, is furnished with transverse gear teeth 128 in the manner of a rack for cooperation with the spur gears 68 and 74 of the motor drive system within the storage box 54. Thus, there is a rack and pinion drive system for this travelling rectangular frame 88.

Turning back to FIG. 6, the travelling rectangular frame 88 is provided with a cross brace 134 at the front end that is connected between the front ends of the first sliding bar 94 in each flexible side portion 90 and 92. In a similar manner, the rear end of the frame 88 is provided with a cross brace 136, as is best seen in FIGS. 6 and 7, that is of T-shaped configuration in transverse cross section. The rear edge 138 of this rear cross brace is adapted to overlie the top portion of the tailgate 24 of the truck bed. The flexible cover sheet 120 is shown adhesively bonded to the top surface of the rear cross brace 136. A series of flat plastic panels 140 is bonded over the cover sheet 120 in the area covering the top surface of the rear cross brace in order to better protect the rear edge of the cover sheet from curling up. These plastic panels 140 are separated to allow for drainage of water flowing down the inclined cover sheet 120.

Turning now to a consideration of the fragmentary, side elevational view of FIG. 10, parts of the storage box 54 are broken away and others are in cross section to provide an understanding of how the travelling rectangular frame 88 of FIG. 6, with the flexible cover sheet 120 stretched thereacross, will act when the frame is shifted forwardly within the wide track 30 of the parallel rails 32 and 34. As soon as the first pair of parallel hinged slide bars 94 ride off of the front end of the bottom wall 40 of the C-shaped rail 32 or 34, those slide bars will tend to hang vertically due to gravity. As the frame 88 progresses in a forward direction, the second pair of parallel slide bars 94 will ride off of the front ends of the two rails, and then there will be two sets of slide bars 94 hanging down vertically within the storage box. This will continue until the first set of parallel slide bars strike the bottom wall 142 of the truck bed 12, then the hinged slide bars will tend to fold in an accordion fashion about the T-links 96, and this takes place in a simple, quiet, and automatic fashion until the rear cross brace 136 reaches the storage box 54 and is unable to proceed further. In other words, the rear cross brace does not enter the storage box but remains outside. The necessary switch controls (not shown) for the motor 72 that drives the travelling frame 88 would be located within the cab 16 of the truck in a convenient location, preferably on the control panel or dashboard for the convenience of the driver. Hence, the movable cover assembly 14 could be operated automatically from within the cab.

In order to provide some reinforcement under the flexible cover sheet 120, an elongated transverse rod 144 is joined between the pairs of parallel slide bars 94, near the center thereof, as is best seen in FIGS. 6 and 7.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A cover assembly for a truck having an open-topped bed with upstanding side panels, a front end wall and a tailgate, the cover assembly comprising:
   a. a track formed by a pair of parallel rails of C-channel configuration, where each rail is adapted to be mounted to the top of the side panels of the truck bed and to extend inwardly therefrom, each rail having an elongated slot extending longitudinally of the rail and being located on the side of the rail facing a similar slot on the other rail;
   b. each of the parallel rails extending at their front end partially into an enlarged storage box that is adapted to fit down into the truck bed, and the box is to extend transversely thereof from one side of the bed to the other;
   c. said track being furnished with a travelling rectangular frame having a pair of flexible side portions formed by a plurality of hinged slide bars that are positioned within the said parallel rails, a cross brace at the front end of the frame joining the first slide bar of the opposite side portions of the frame, and a sealing cross brace at the rear end of the frame that connects the last slide bar of each side portion of the frame and also is adapted to overlie the top portion of the tailgate so as to prevent rain from entering the truck bed in the vicinity of the tailgate;

d. said hinged slide bars in each side portion of the frame being separated by a short link and hinged thereto so that the flexible side portions of the frame may assume accordion folds when the frame is shifted forwardly within the track causing the hinged slide bars to ride off of the front end of the rails of the track and to fold neatly within the said storage box;

e. and a sheet of flexible material fitted over the said travelling rectangular frame for covering the truck bed when the frame is in rearward position, said flexible sheet being fastened to the hinged slide bars and extending through the elongated slots in the sides of the parallel rails of the track, and a transverse slot in one wall of the storage box extending between the parallel rails to allow the flexible sheet to enter and leave the box with the travelling frame;

f. and motive means within the storage box for engaging the hinged slide bars and controlling the movement and location of the travelling frame and its cover sheet.

2. A cover assembly as recited in claim 1 wherein the hinged slide bars and the connecting links are furnished with transverse gear teeth on the undersurface thereof, and said motive means comprises a motor-driven gear positioned in alignment with each flexible side portion of the travelling frame and in driving engagement with the gear teeth thereof in the manner of a rack and pinion drive.

3. A cover assembly as recited in claim 2 wherein each hinged slide bar as well as each short link is furnished with a step portion on the side thereof that faces the opposite side portion of the travelling frame, the side edges of the said flexible sheet of cover material being seated on the said step portions of the slide bars and connecting links, and a mounting bar fastened over the edge of the flexible sheet on each step portion of each slide bar, and a mounting block fastened over the edge of the flexible sheet on each step portion of each connecting link.

4. A cover assembly as recited in claim 3 wherein an elongated wedge member is interposed between the top of each side panel of the truck bed and the mounting means of the related rail of the track so that the track and hence the flexible sheet of material is inclined downwardly from front to rear of the cover assembly so that rain water will naturally run off and not accumulate on the cover assembly.

5. A cover assembly as recited in claim 4 wherein each short link is of T-shaped configuration, where the head of the "T" has a bolt hole on each side, and each end of each slide bar has an ear with a bolt hole therein, and bolt means for joining each side of the link to the adjacent end of a slide bar so as to enable the flexible side portions of the travelling frame to fold when the frame is moved into the storage box.

6. A cover assembly as recited in claim 5 wherein the said parallel rails of the track are formed of extruded plastic, and the flexible sheet of material is rubberized nylon material.

7. A cover assembly as recited in claim 6 wherein at least some of the plurality of hinged slide bars are furnished with a transverse rod spanning the space between opposite slide bars to support the flexible cover sheet.

* * * * *